US009342015B2

United States Patent
Ueda (10) Patent No.: US 9,342,015 B2
(45) Date of Patent: May 17, 2016

(54) IMAGE FORMING APPARATUS (71) Applicant: CANON KABUSHIKI KAISHA, Tokyo (JP)

(72) Inventor: Shinichi Ueda, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/845,559

(22) Filed: Sep. 4, 2015

(65) Prior Publication Data
US 2016/0070220 A1    Mar. 10, 2016

(30) Foreign Application Priority Data

Sep. 10, 2014    (JP) .................. 2014-184285

(51) Int. Cl.
*G03G 15/00*    (2006.01)
*G03G 15/20*    (2006.01)

(52) U.S. Cl.
CPC ............ *G03G 15/50* (2013.01); *G03G 15/2064* (2013.01)

(58) Field of Classification Search
CPC ....................................................... G03G 15/50
See application file for complete search history.

(56) References Cited

U.S. PATENT DOCUMENTS

| 6,163,660 A | 12/2000 | Maeshima et al. |
| 8,200,102 B2 | 6/2012 | Zensai |
| 8,457,507 B2 | 6/2013 | Zensai |
| 2007/0122165 A1* | 5/2007 | Igarashi ............ G03G 15/0822 399/12 |
| 2009/0279905 A1* | 11/2009 | Zensai ............... G03G 15/1605 399/12 |

FOREIGN PATENT DOCUMENTS

| JP | 6-118736 A | 4/1994 |
| JP | 6-167885 A | 6/1994 |
| JP | 2009-271270 A | 11/2009 |

* cited by examiner

*Primary Examiner* — G. M. Hyder
(74) *Attorney, Agent, or Firm* — Fitzpatrick, Cella, Harper & Scinto (57) ABSTRACT

An image forming apparatus includes an optical detecting device; a movable unit including a rotatable member having a first light-blocking surface and a second light-blocking surface; and a control unit. The movable unit rotates with rotation of the rotatable member so that the second light-blocking surface is movable to a first position where the optical detecting device is light-blocked and a second position where the optical detecting device is not light-blocked, and includes a locking member for locking the second light-blocking surface in the second position. When the first and second light-blocking surfaces pass through a detecting portion of the optical detecting device, the control unit discriminates a state of the movable unit on the basis of a detection result of the optical detecting device.

15 Claims, 10 Drawing Sheets

IMAGE FORMING APPARATUS

FIELD OF THE INVENTION AND RELATED ART

The present invention relates to an image forming apparatus, such as a printer, a copying machine or a facsimile machine, using an electrophotographic process.

In a conventional image forming apparatus using the electrophotographic process, there is a constitution in which a unit for which a predetermined lifetime elapses is exchangeable. As the exchangeable unit, a process cartridge, a transfer belt unit, a fixing unit and the like which are described below have been known.

The process cartridge is prepared by assembling a photosensitive drum, a cleaner, a developing device and the like into a unit, and the unit is exchangeable with respect to an image forming apparatus main assembly as a whole.

The transfer belt unit is constituted by a transfer roller for transferring a toner image from an image bearing member (photosensitive drum, intermediary transfer belt or the like) onto a transfer material, a belt member, a stretching roller and the like, and is exchangeable with respect to the image forming apparatus main assembly.

The fixing unit is constituted by a fixing roller for fixing the transferred toner image on the transfer material and a heating roller, and is exchangeable with respect to the image forming apparatus main assembly.

These exchangeable units are treated as consumables and are exchanged by a user or a service person when they reach the end of their lifetimes.

With respect to these exchangeable units, in order to notify the user of necessity of exchange of the units, the image forming apparatus includes a counter for counting the number of rotations of each of the units. When a center value which is a use (operation) history of the unit reaches a predetermined value, the image forming apparatus displays warning indicating the necessity of the exchange of the unit at a display portion or the like. The user looks at this warning and thus can exchange the unit at proper timing.

When an old unit which is used up is exchanged with a new unit, the use history of the past is reset, and then the image forming apparatus recognizes that the unit is new. In this case, the user or the service person resets the user history through an operating portion, but there is a possibility that the user (or service person) erroneously performs an operating procedure to fail to perform a proper reset operation. Therefore, a constitution in which whether the unit is old or new unit is detected by mounting of the unit or a series of operations and which does not rely on a manual operation has been proposed.

Japanese Laid-Open Patent Application (JP-A) Hei 6-118736 has proposed a method of discriminating whether the unit is old or new by a fuse provided in the unit in an image forming apparatus. In this method, an electrical conduction state of the fuse for the unit mounted in an apparatus main assembly is detected and then whether the unit is old or new is detected. In the case where the unit is discriminated as a new one, a counter is reset and then a predetermined initializing process is executed. When the fuse has blown, thereafter electrical conduction of the fuse is not detected and therefore the unit is discriminated as an old unit.

JP-A Hei 6-167885 has proposed a method of discriminating old and new units by an operation of a micro-switch. In this method, the micro-switch is operated by a rotatable cam mounted on a rotation shaft during first rotation of a new unit after mounting of the new unit, so that detection that the unit is a new one is made. Thereafter, the cam is retracted and does not urge the micro-switch during subsequent rotation, so that the unit is not discriminated as the new unit.

However, in JP-A Hei 6-118736, a circuit for executing detection of a blowout of the fuse and the blowout of the fuse is required for performing old and new detection of the unit. Further, also contacts for electrically connecting the image forming apparatus main assembly and the unit are required, so that the constitution becomes complicated in order to enhance a stable electrical conduction property.

In a JP-A Hei 6-167885, in order to perform the old and new detection of the unit, there is a need to provide the micro-switch and a circuit for detecting an operation of the micro-switch.

Accordingly, in the image forming apparatus, in order to detect a plurality of old and new units with respect to the above-described process cartridge, transfer belt unit and fixing unit, an exclusive circuit as disclosed in JP-A Hei 6-118736 and JP-A Hei 6-167885 is needed in every unit, which is a factor in increasing cost.

SUMMARY OF THE INVENTION

A principal object of the present invention is to provide an image forming apparatus capable of discriminating a state of an exchangeable unit with a simple constitution.

Another object of the present invention is to provide the image forming apparatus capable of discriminating the state of the exchangeable unit while suppressing an increase in cost.

According to an aspect of the present invention, there is provided an image forming apparatus comprising: an optical detecting device mounted in a main assembly of the image forming apparatus; a movable unit, detachably mountable to the main assembly, including a rotatable member having a first light-blocking surface for blocking light and a second light-blocking surface different from the first light-blocking surface in length of a light-blocking region of the rotatable member with respect to a rotational direction of the rotatable member; and a control unit, wherein the movable unit rotates with rotation of the rotatable member so that the second light-blocking surface is movable to a first position where the optical detecting device is light-blocked and a second position where the optical detecting device is not light-blocked, and includes a locking member for locking the second light-blocking surface so that the second light-blocking surface moved to the second position is maintained in the second position, and wherein when the first light-blocking surface and the second light-blocking surface pass through a detecting portion of the optical detecting device by the rotation of the rotatable member, the control unit discriminates a state of the movable unit on the basis of a detection result of the optical detecting device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

In FIG. 1, (a) and (b) are schematic views for illustrating an image forming apparatus according to Embodiment 1.

In FIG. 2, (a) and (b) are schematic views for illustrating an image forming apparatus according to Embodiments 1 and 2.

In FIG. 3, (a) and (b) are schematic views for illustrating the image forming apparatus in Embodiment 1.

In FIG. 5, (a) to (h) are schematic views for illustrating the image forming apparatus in Embodiment 1.

In FIG. 6, (a) to (e) are schematic views for illustrating the image forming apparatus in Embodiment 1.

In FIG. 9, (a) to (e) are schematic views for illustrating the image forming apparatus in Embodiment 2.

In FIG. 10, (a) is a schematic view for illustrating a signal of a detecting means in Embodiments 1 and 2, and (b) is a flow chart of signal detection control in Embodiments 1 and 2.

DESCRIPTION OF THE EMBODIMENTS

Embodiments of the present invention will be specifically described with reference to the drawings. Dimensions, materials, shapes and relative arrangements of constituent elements described in the following embodiments should be appropriately changed depending on structures and various conditions of devices (apparatuses) to which the present invention is applied. Accordingly, the scope of the present invention is not intended to be limited to the following embodiments unless otherwise specified.

Embodiment 1

In the following, a laser printer which is an example of an image forming apparatus is shown, and Embodiment 1 according to the present invention will be described.

Figure 2:
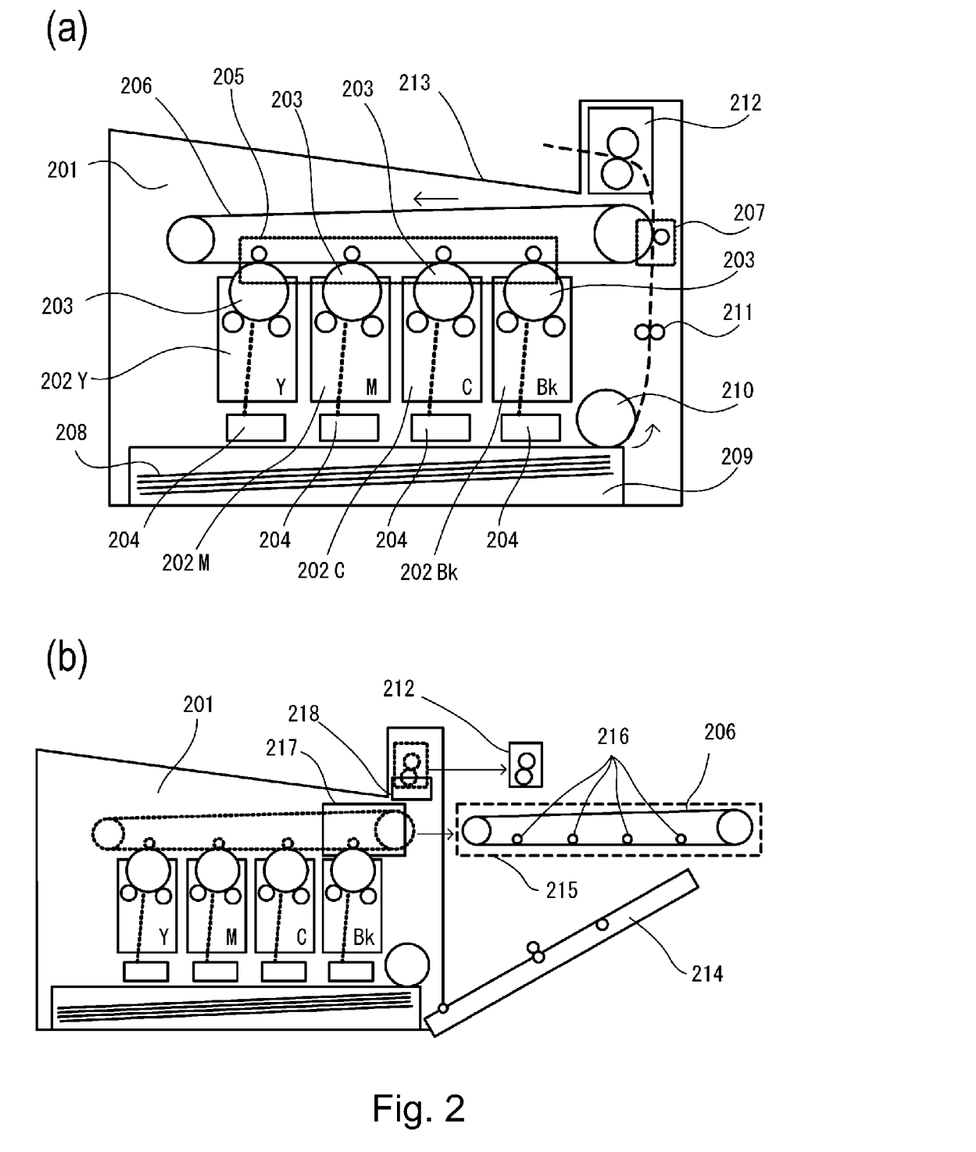

In FIG. 2, (a) is a sectional view of a laser printer 201.

Four process cartridges 202Y, 202M, 202C, 202K are used for forming toner images of yellow, magenta, cyan, black, respectively. Each process cartridge 202 is detachably mounted in the laser printer 201. Inside each process cartridge 202, a photosensitive drum 202, and a developing device and the like which are process means actable on the photosensitive drum 202 are provided. In the process cartridge 202, a latent image formed on the photosensitive drum 203 by laser light emitted from an exposure device 204 on the basis of information is developed into the toner image by a known process.

The thus-formed toner image is transferred onto a transfer belt 206 at a primary transfer portion 205. The respective color toner images are successively transferred onto the transfer belt 206, so that a toner image consisting of the four colors is formed on the surface of the transfer belt 206. The transferred toner image is fed to a secondary transfer portion 207 by the transfer belt 206.

On the other hand, at a lower portion of the laser printer 201, a recording material stacking means 209 capable of accommodating sheets of a recording material 208 is provided. The recording material 208 is separated and fed one by one by rotating a sheet-feeding roller 210 provided in the neighborhood of a free end portion of the recording material 208. Thereafter, the recording material 208 separated and fed is fed toward a secondary transfer portion 207 by a feeding roller pair 211.

Then, at the secondary transfer portion 207, the toner image on the surface of the transfer belt 206 is transferred onto the recording material 208. The recording material 208 on which an unfixed toner image is transferred is fed toward a further downstream side and is pressed and heated by a fixing unit 212, so that the toner is melted and thus the toner image is fixed on the recording material 208. Thereafter, the recording material 208 is discharged on a sheet-discharge tray 213. By a series of operations described above, formation of the image on the surface of the recording material 208 is effected.

In the laser printer 201, in order to permit exchange of a transfer belt unit 215 including the transfer belt which has reached the end of its lifetime or the fixing unit 212 including a fixing roller which has reached the end of its lifetime, each of the units is constituted as a movable unit and thus is made exchangeable with respect to the apparatus main assembly. As shown in (b) of FIG. 2, when a door 214 openably provided on a side surface of the laser printer 201 is opened, the transfer belt unit 215 and the fixing unit 212 can be pulled out from the apparatus main assembly of the laser printer 201 in a rightward direction in the figure, so that the unit can be exchanged with a new movable unit.

The transfer belt unit 215 is constituted by the transfer belt 206 and primary transfer rollers 216. The primary transfer rollers 216 include a mechanism capable of performing a contact-and-separation operation of the primary transfer rollers 216 depending on a print signal of the laser printer 201. The mechanism capable of performing the contact-and-separation operation will be described later using FIG. 3. Further, a drive control device 217 for controlling the contact-and-separation operation is provided in the laser printer 201.

The contact-and-separation operation of the primary transfer rollers 216 of the transfer belt unit 215 will be described using (a) of FIG. 3.

A first contact-and-separation mode corresponds to an all separation state in which all of the primary transfer rollers 216 are separated (spaced) from the photosensitive drum 203. An operation in this mode is performed for preventing a lowering in sliding resistance and abrasion of a sliding portion by separating the transfer belt 206 and the photosensitive drum 203 from each other to eliminate friction therebetween during pre-rotation and post-rotation of a printing operation.

A second contact-and-separation mode corresponds to a monochromatic contact state in which the primary transfer roller 216Bk contacts the photosensitive drum 203Bk of the black process cartridge 202Bk and other three primary transfer rollers 216Y, 216M, 216C are separated from the associated photosensitive drums 203Y, 203M, 203C, respectively. An operation in this mode is performed for primary-transferring the image from the block photosensitive drum 203Bk onto the transfer belt 206. By preventing the photosensitive drums 203Y, 203K, 203C, which are not required to perform the printing operation, from contacting the transfer belt 206, it is possible to stop rotation of the photosensitive drums 203Y, 203M, 203C.

A third contact-and-separation mode corresponds to a full-color contact state in which all of the primary transfer rollers 216Y, 216M, 216C, 216Bk are contacted to the photosensitive drums 203Y, 203M, 203C, 203Bk, respectively. An operation in this mode is performed for primary-transferring the images from all of the photosensitive drums 203 onto the transfer roller 206.

A constitution for switching the operations in the above-described three (first to third) contact-and-separation modes will be described using (b) of FIG. 3.

Figure 3:
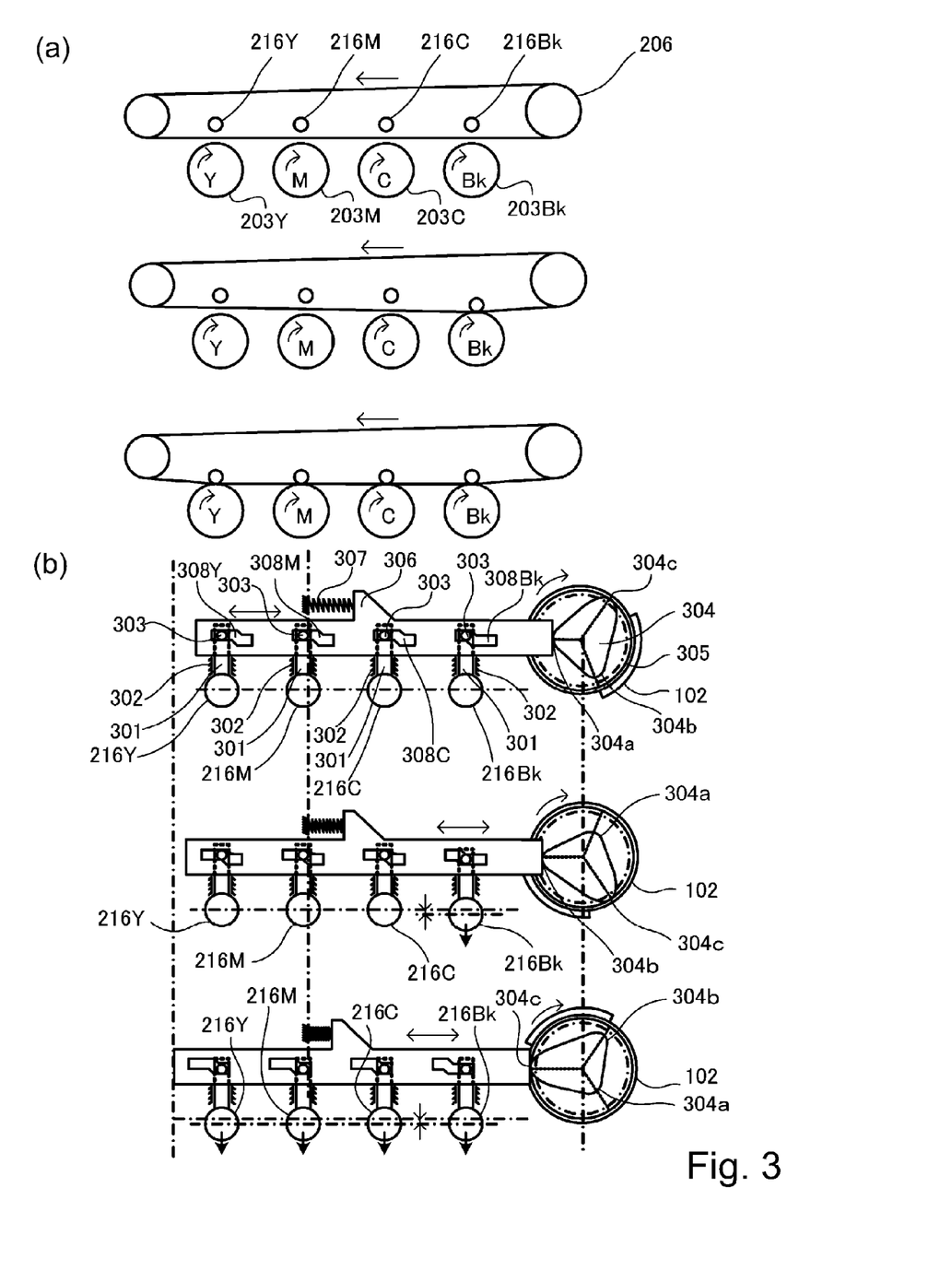

In FIG. 3, (b) shows a constitution, provided inside the transfer belt unit 215, for reciprocating the four primary transfer rollers 216 in a vertical direction in the figure. Each of the primary transfer rollers 216 is mounted on a primary transfer roller supporting member 301. The primary transfer roller supporting member 201 is supported by a sliding portion 302 provided on a frame portion for the transfer belt 206. At an end portion of the primary transfer roller supporting member 301, a boss 303 is provided.

A cam 304 has three acting surfaces 304a, 304b, 304c and is mounted rotatably. A gear 305 is mounted coaxially with the cam 304, so that the cam 304 is continuously rotated every 120 degrees by the drive control device using a solenoid described later.

A rotatable member 102 as a phase detecting means for a rotation shaft is mounted coaxially with the cam 304. The rotatable member 102 is used for detecting the phase of the cam 304 by a light-blocking surface (plane) mounted on the rotatable member 102 and for detecting whether or not the cam 304 is operated to be moved to a desired stop position.

A slider 306 is mounted slidably in a horizontal direction in the figure, and is urged toward the cam 304 by a compression spring 307. Therefore, the slider 306 is movable to three stop positions (all separation position, monochromatic contact position, full-color contact position) shown in (b) of FIG. 3 depending on the three acting surfaces 304a, 304b, 304c of the cam 304.

The slider 306 is provided with crank-shaped portions 308Y, 308M, 308C, 308Bk correspondingly to the four primary transfer rollers 216Y, 216M, 216C, 216Bk, respectively. Each of the crank-shaped portions 308 is constituted so that the boss 303 as a free end portion of the primary transfer roller supporting member 301 can move the associated primary transfer roller 216 in the vertical direction in the figure depending on a horizontal position of the slider 306 in the figure.

The four crank-shaped portions 308 are adjusted so that the four primary transfer rollers 216 can be moved in such a manner that the three positions where the slider 306 stops corresponds to the three contact-and-separation modes shown in (a) of FIG. 3. Therefore, by rotating the cam 304 every 120 degrees, as shown in (b) of FIG. 3, the crank-shaped portions 308 are disposed so that the position of the slider 306 can be switched in the order of the all separation position, the monochromatic contact position and the full-color contact position.

In the operation in the full separation mode, all of the primary transfer rollers 216 are moved upward in the vertical direction in the figure, i.e., in a direction in which the transfer rollers 206 are separated from the photosensitive drums 203, and thus being spaced from the photosensitive drums 203. Compared with the operation in the full separation mode, in the operation in the monochromatic contact mode, only the primary transfer roller 216Bk is moved downward by a deviation amount of the crank-shaped portion 304Bk in the vertical direction in the figure, i.e., toward the photosensitive drum 203Bk side, and thus is contacted to the photosensitive drum 203Bk. Further, in the operation in the full-color contact mode, all of the primary transfer rollers 206 are moved toward the photosensitive drum 203 sides similarly as in the case of the primary transfer roller 216Bk, and thus are contacted to the photosensitive drums 203.

Figure 4:
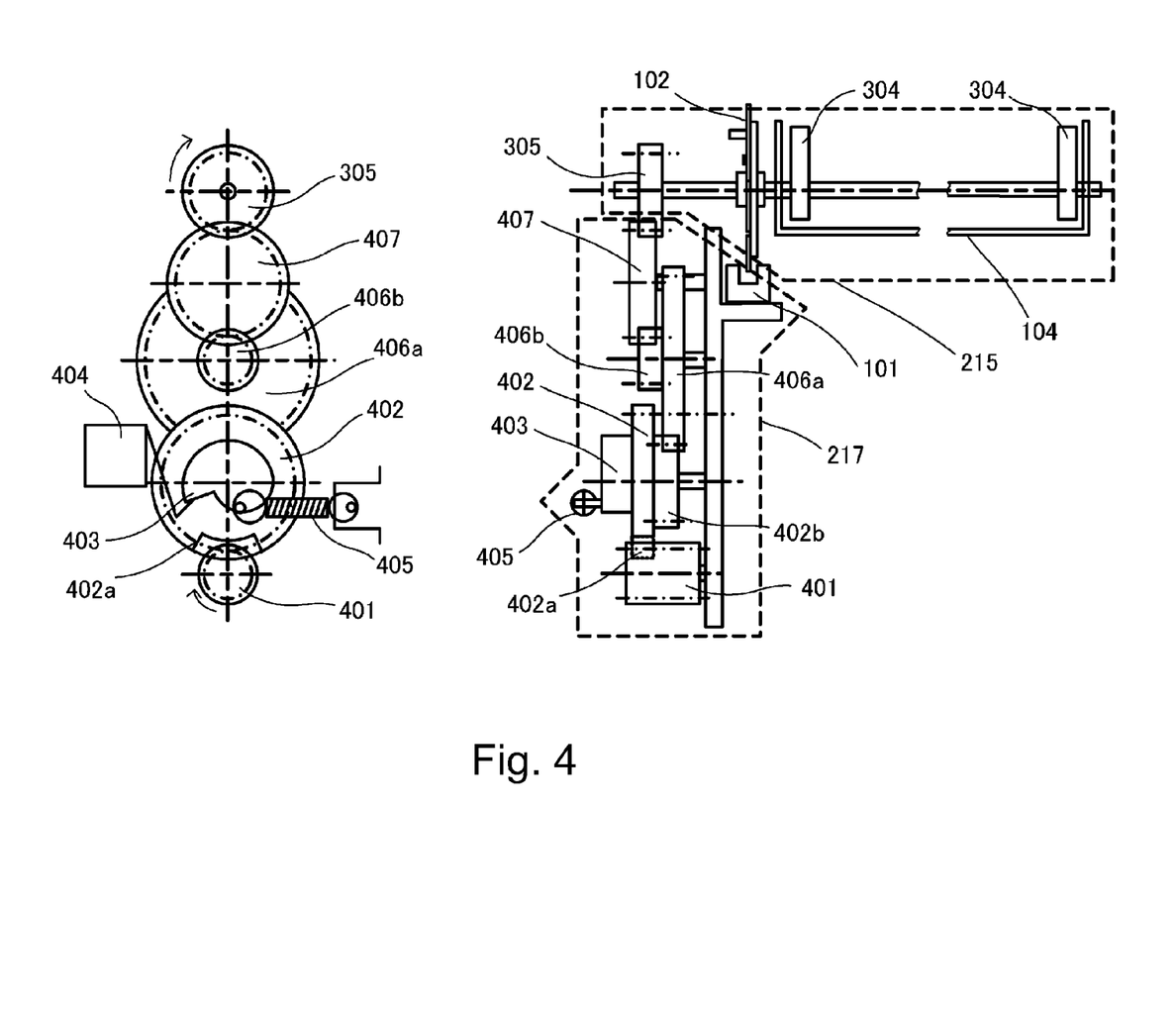
FIG. 4 is a schematic view for illustrating the image forming apparatus in Embodiment 1.

Here, the drive control device 217 using the solenoid will be described using FIG. 4.

A driving gear 401 is rotated in a certain direction by a driving source rotating at predetermined timing and a predetermined number of rotations.

A gear 402 having partly omitted teeth is prepared by integrally molding a lock-shaped portion 403, a teeth-omitted portion 402a and a gear 402b. The gear 402 having partly omitted teeth is at rest by locking of a solenoid 404 on the integrally formed lock-shaped portion 403 not only in a state in which the gear 402 is urged in a rotational direction by a tension spring 405 but also in a state in which the teeth-omitted portion 402a does not engage with the driving gear 401. When the locking of the solenoid 404 on the lock-shaped portion 403 is released (eliminated), the tension spring 405 rotates the gear 402 in the rotational direction. As a result, the gear 402 engages with the driving gear 401 to transmit a driving force to the driving gear 401. Then, when the gear 402 rotates through one full turn and the teeth-omitted portion 402a thereof opposes the driving gear 401, the gear 402 is rotated by an urging force of the tension spring 405, so that the gear 402 is stopped by a locking means consisting of the lock-shaped portion 403 and the solenoid 404 in the state in which the teeth-omitted portion 402a does not engage with the driving gear 401.

A stepped gear 406 is prepared by integrally molding two gears 406a and 406b. A gear 407 engages with the gear 406b of the stepped gear 406, and transmits a rotational force of the stopped gear 406 to a gear 305 engaging with the gear 406a.

Here, a (speed) reduction ratio of a gear train disposed as described above will be described. The number of teeth of gear train consisting of the gears 402b, 406a, 406b, 407, 305 is set so that the reduction ratio is 3:1. Accordingly, every one full turn of the gear 402 having partly omitted teeth, the cam 304 mounted coaxially with the gear 305 rotates through ⅓ of one full turn, i.e., by 120 degrees.

Therefore, it is possible to continuously switch positions of the three acting surfaces, and thus by repeating release (elimination) of locking and locking by the locking means consisting of the lock-shaped portion 403 and the solenoid 404, it becomes possible to move the cam 304 to a desired control position. That is, by switching the position of the cam 304 to the three positions, the position of the rotatable member 102 can be continuously switched to the three phase positions (all separation position, monochromatic contact position, full-color contact position).

Figure 1:
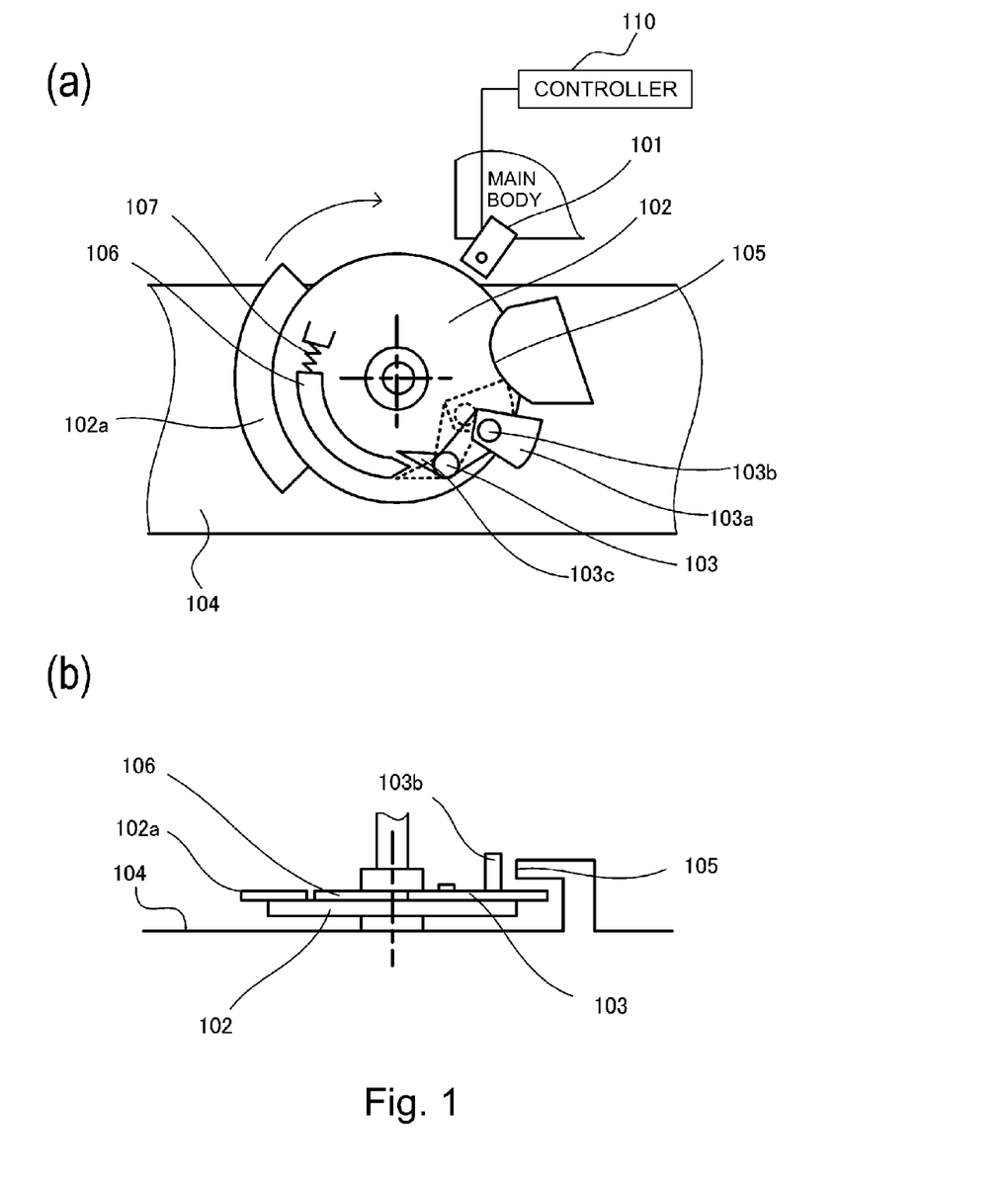

In this embodiment, the state of the transfer belt unit 215 as the movable unit is discriminated using the optical detecting device. Specifically, whether or not the transfer belt unit 215 is a new one is discriminated by a controller 110 as a control unit. FIG. 1 shows the controller 110 and the optical detecting device which are used for discriminating the state of the transfer belt unit 215.

In the apparatus main assembly side of the laser printer 201, a photo-interruptor 101 as the optical detecting device is mounted.

The rotatable member 102 is mounted coaxially with the cam 304 as described above, so that the rotatable member 102 is rotated every 120 degrees by the driving operation.

The rotatable member 102 is integrally provided with a first light-blocking surface 102a for light-blocking the photo-interruptor 101 at a predetermined phase. The first light-blocking surface 102a light-blocks the photo-interruptor 101 at the position (monochromatic contact position) of a monochromatic printing operation of the above-described three stop positions. The first light-blocking surface 102a is used as a means for checking whether or not the operation is abnormal by discriminating whether or not the photo-interruptor 101 is light-blocked in the state in which the rotatable member 102 is moved to the monochromatic contact position during a moving operation of the rotatable member 102 from a state in which an engine is at rest to the monochromatic contact position or the full-color contact position.

A movable light-blocking member 103 is rotatably mounted on the rotatable member 102. The movable light-blocking member 103 is integrally provided with a second light-blocking surface 103a for light-blocking the photo-interruptor 101. The second light-blocking surface 103a differs from the first light-blocking surface 102a in length of a light-blocking region of the rotatable member 102 with respect to the rotational direction of the rotatable member 102. Specifically, a light-block time of the photo-interruptor 101 by the second light-blocking surface 103a when the rotatable member 102 is rotated is made shorter than a light-block time of the photo-interruptor 101 by the first light-blocking surface 102a. The movable light-blocking member 103 is provided movably between a first stop position indicated by a solid line in FIG. 1 and a second stop position indicated by a broken line in FIG. 1. The first stop position of the movable light-blocking member 103 is a first position where the second light-blocking surface 103a projects from an outer periphery of the rotatable member 102 and light-blocks the photo-interruptor 101. The second stop position of the movable light-blocking member 103 is a second position where the second light-blocking surface 103a retracts inside the rotatable member 102 and does not light-block the photo-interruptor 101. Depending on which stop position the movable light-blocking member is in, whether the transfer belt unit 215 is a new one or an old one is detected by an operation described later.

On the frame 104 for the transfer belt unit 215, a cam surface 105 as a cam member is formed. The cam surface 105 changes the stop position of the movable light-blocking member 103, moving with rotation of the rotatable member 102 by urging a boss 103b provided on the rotatable member 102, from the first stop position to the second stop position which are described above.

A locking member 106 as a locking means is mounted on the rotatable member 102 so as to be movable in the rotational direction of the rotatable member 102. A center of a rotation locus of the locking member 106 coincides with a rotation center of the rotatable member 102. The locking member 106 is urged toward the movable light-blocking member 103 side by an urging member 107. The locking member 106 regulates a hook-shaped portion 103c provided at an end portion of the movable light-blocking member 103, and the position thereof corresponds to the two stop positions of the movable light-blocking member 103 moving depending on the rotation of the rotatable member 102.

In the above-described constitution, an initializing operation when a new transfer belt unit 215 is mounted in the light-block 201 will be described using FIG. 5.

The light-block 201 performs an operation for placing the contact-and-separation state of the primary transfer rollers 216 of the transfer belt unit 215 in the all separation state by the initializing operation.

In the initializing operation after the transfer belt unit 215 is mounted in the apparatus main assembly of the light-block 201, when the rotatable member 102 is continuously rotated without being stopped and the first light-blocking surface 102a is detected by the photo-interruptor 101, a stopping operation is performed. In FIG. 5, (a) to (h) sequentially show operation states of the rotatable member 102 and its peripheral parts.

Figure 5:
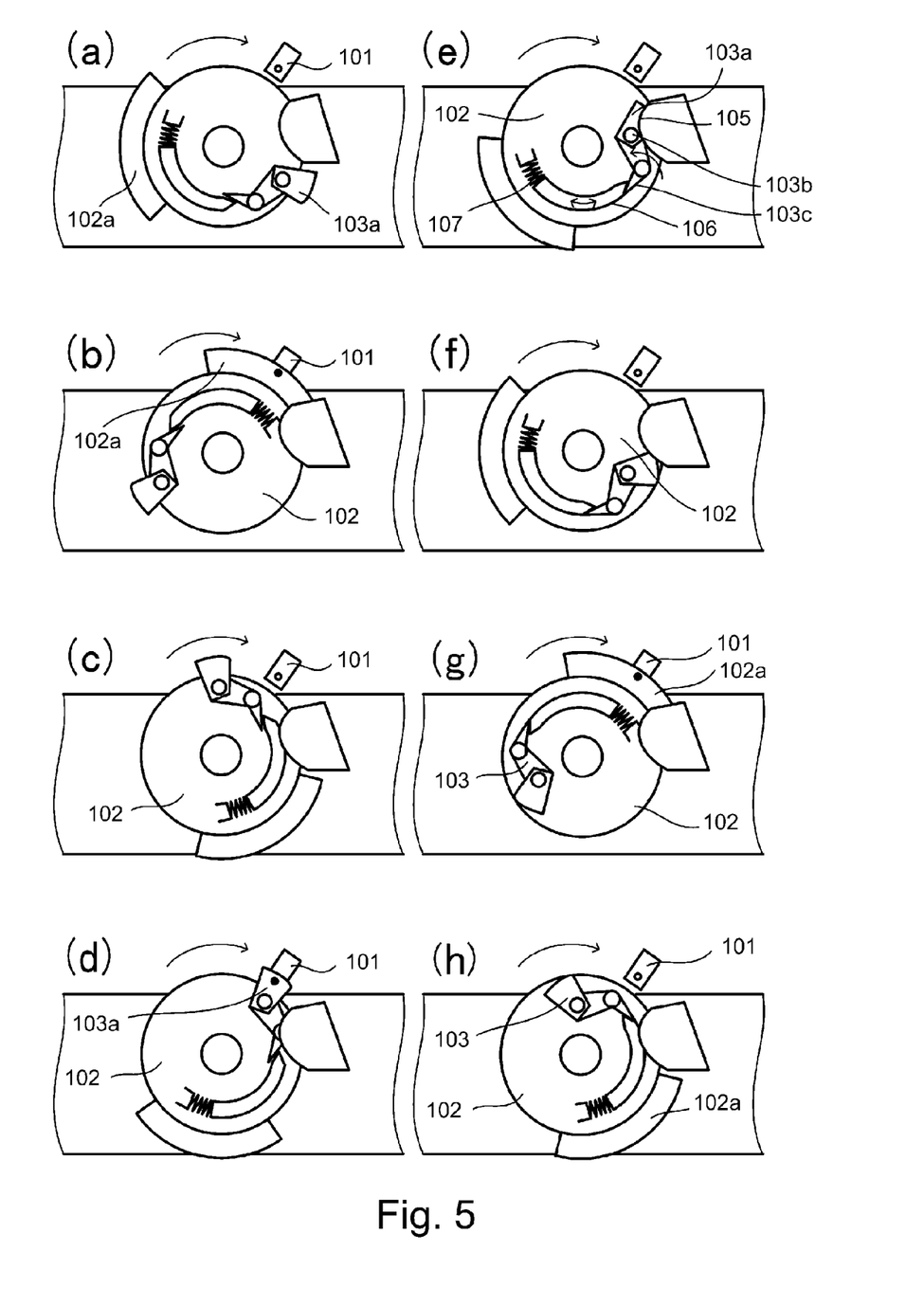

In FIG. 5, (a) shows the state immediately after the new transfer belt unit 215 is inserted into the light-block 201. At this time, all of the primary transfer rollers 216 are in the all separation state. Further, both of the first light-blocking surface 102a and the second light-blocking surface 103a do not light-block the photo-interruptor 101.

In FIG. 5, (b) shows the state of the monochromatic contact mode in which the rotatable member 102 rotates by 120 degrees and thus only the black primary transfer roller 216Bk contacts the photosensitive drum and other three primary transfer rollers are spaced from the photosensitive drums.

In this monochromatic contact mode state, the first light-blocking surface 102a light-blocks the photo-interruptor 101. At this time, the light-block 201 discriminates which one of the first light-blocking surface 102a and the second light-blocking surface 103a light-blocks the photo-interruptor 101, by signal detection control which will be described hereinafter with reference to FIG. 10. By this control, the laser printer 201 recognizes that the light-blocking surface detected by the photo-interruptor 101 is the first light-blocking surface 102a. Therefore, the laser printer 201 can recognize that the contact-and-separation mode state returns to the all separation mode state by the rotating operation from this state by remaining 240 degrees.

In FIG. 5, (c) shows the state of the full-color contact mode in which all of the primary transfer rollers 216 contact the photosensitive drums. In this state, the photo-interruptor 101 is not light-blocked by either of the first light-blocking surface 102a and the second light-blocking surface 103a.

In FIG. 5, (d) shows the state in which the rotatable member 102 further rotates and thus the second light-blocking surface 103a light-blocks the photo-interruptor 101. The laser printer 201 effects the control described later by a signal of the photo-interruptor 101, so that the laser printer 201 can detect the first light-blocking surface 102a and the second light-blocking surface 103a. By this control, the laser printer 201 recognizes that the light-blocking surface light-blocking the photo-interruptor 101 in the state of (d) of FIG. 5 is the second light-blocking surface 103a. Therefore, the laser printer 201 discriminates that a currently mounted transfer belt unit 215 is a new unit, and then resets a sheet-passing count relating to the transfer belt unit 215.

In FIG. 5, (e) shows the state in which the rotatable member 102 further rotates from the state of (d) of FIG. 5 and thus the boss 103b provided on the movable light-blocking member 103 is contacted to and urged by the cam surface 105. The movable light-blocking member 103 is rotated in a center direction of the rotatable member 102, so that the second light-blocking surface 103a is retracted to the inside of the rotatable member 102 and is pushed into a position where the second light-blocking surface 103a cannot light-block the photo-interruptor 101. At this time, the hook-shaped portion 103c pushes the locking member 106 in the rotational direction of the rotatable member 102 against the urging member, so that a relative position between the locking member 106 and the hook-shaped portion 103c is reversed to that before the pushing-in. As a result, the movable light-blocking member 103 cannot return to the original position. That is, the movable light-blocking member 103 is locked by the locking member 106 so as to maintain the second light-blocking surface 103a moved to the second position by the cam surface 105 at the second position.

In FIG. 5, (f) shows the state in which the rotatable member 102 rotates by 120 degrees from the state of (c) of FIG. 5 and thus movement of all of the primary transfer rollers 216 to the all separation state in which all of the primary transfer rollers 216 are separated from the photosensitive drums is completed. By an operation of a first one full turn in the initializing operation, the movable light-blocking member 103 is moved to the second stop position and is regulated (locked) at the second stop position. For that reason, the second light-blocking surface 103a is not detected by the photo-interruptor 101 by subsequent rotation of the rotatable member 102 until the unit is exchanged with a new one next time. The initializing operation of the transfer belt unit 215 is thus completed.

Here, using (a) and (b) of FIG. 10, the signal detection control of the photo-interruptor 101 will be described.

Figure 10:
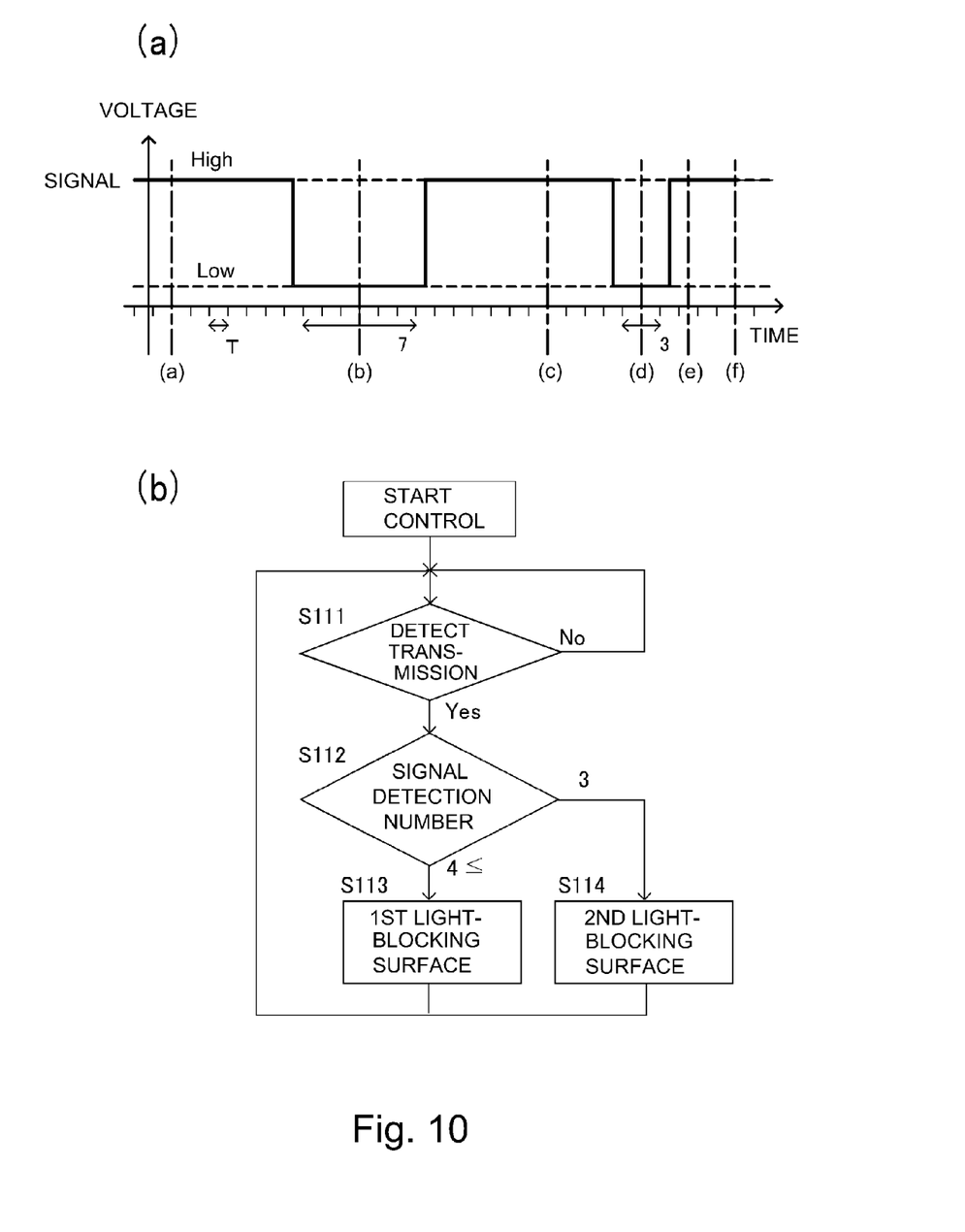

In FIG. 10, (a) shows a signal change of the photo-interruptor 101 in (a) to (f) of FIG. 5. In (a) of FIG. 10, (a) to (f) correspond to (a) to (f) of FIG. 5, respectively.

In (a) of FIG. 10, the abscissa represents a time, and the ordinate represents an output voltage of a sensor signal. The signal of the photo-interruptor 101 is "High" in a (light-)transmission state and is "Low in a light-blocked state. The signal of the photo-interruptor 101 is detected with a certain (time) interval T.

According to (a) of FIG. 10, when the first light-blocking surface 102a passes through the photo-interruptor 101, a light-blocking signal can be detected 7 times. Further, when the second light-blocking surface 103a passes through the photo-interruptor 101, the light-blocking signal can be detected 3 times. That is, a length of a light-block region of the second light-blocking surface 103a in the rotational direction is made shorter than a length of a light-block region of the first light-blocking surface 102a in the rotational direction, so that a light-block time of the photo-interruptor 101 by the second light-blocking surface 103a is set so as to be shorter than a light-block time of the photo-interruptor 101 by the first light-blocking surface 102a.

In FIG. 10, (b) is a flowchart of an operation of processing the signal obtained from the photo-interruptor 101.

Here, the light-block 201 includes, as shown in FIG. 1, the controller 110 as a control means for detecting the rotation phase of the rotatable member 102 from a detection signal of the photo-interruptor 101. This controller 110 effects the following control by the detection signal from the photo-interruptor 101.

When the initializing operation is started, the control 110 is on stand-by waiting for the transmission state of the photo-interruptor 101. This is because as described later, the controller 110 meets the case where the phase of the rotatable member 102 is deviated (shifted).

When light-blocking surface discriminating control is started, the photo-interruptor 101 detects the (light) transmission (S111) and then is placed in the light-blocked state by either one of the first light-blocking surface 102a and the second light-blocking surface 103a. At this time, in the case where the number of times of light-block detection made with the certain interval T is not less than a predetermined number (4 times or more in this embodiment), the controller 110 can discriminate that the light-blocking surface light-blocking the photo-interruptor 101 is the first light-blocking surface 102a (S113). On the other hand, in the case where the number of times of the light-block detection is less than the predetermined number (3 times in this embodiment), the controller 110 can discriminate that the light-blocking surface is the second light-blocking surface 103a (S114).

In FIG. 5, (g) and (h) show an operation after the completion of the initializing operation of the transfer belt unit 215. As shown in (f) of FIG. 5, the movable light-blocking member 103 is regulated by the locking member 106 while being moved and kept at the second stop position. For that reason, as shown in (g) and (h) of FIG. 5, in subsequent rotation of the rotatable member 102, information detected by the photo-interruptor 101 is only information that the predetermined phase (the monochromatic contact position) is by the light-blocking by the first light-blocking surface 102a. Therefore, the once reset sheet-passing count relating to the transfer belt unit 215 is not reset again, but the mode detected by the photo-interruptor 101 is the contact-and-separation mode of the primary transfer rollers 216.

This state is unchanged even in the case where the transfer belt unit 215 is demounted from the laser printer 201 for maintenance or the like and then mounted again in the laser printer 201, and thus does not influence the sheet-passing count of the transfer belt unit 215.

Next, using FIG. 6, the case where the rotatable member 102 is operated in a deviated (shifted) state will be described. In this case, a new transfer belt unit 215 shifts in contact-and-separation state from an original all separation state by shock during transportation, with the result that there is a possibility that the signal detected by the photo-interruptor 101 differs from that shown in FIG. 5. In this embodiment, the case where the contact-and-separation state is the monochromatic contact state will be described as an example.

Figure 6:
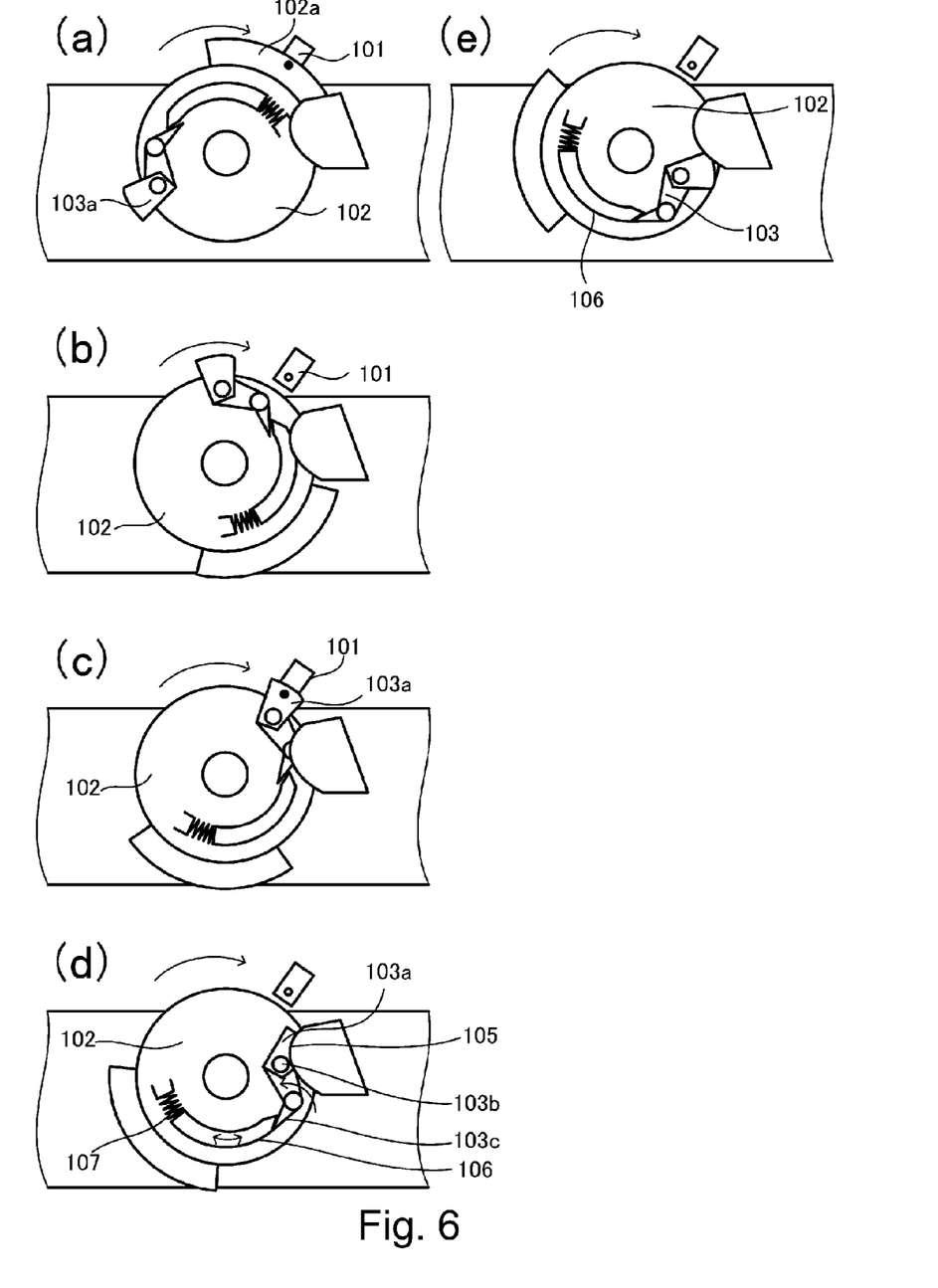

In FIG. 6, (a) shows a state immediately after the transfer belt unit 215 is inserted. The rotatable member 102 is in the monochromatic contact position, and therefore the photo-interruptor 101 is light-blocked by the first light-blocking surface 102a. In the control of the laser printer 201, in the case where the photo-interruptor 101 is light-blocked before the operation, it is unknown that the photo-interruptor 101 is light-blocked by which one of the first light-blocking surface 102a and the second light-blocking surface 103a. For that reason, in the case where initial light-blocking is detected, the laser printer 201 waits for a first (light-)transmission state and then by the light-blocked state detected thereafter, the light-blocking surface is discriminated. Therefore, in this state, whether the transfer belt unit 215 is old or new cannot be discriminated as yet.

In FIG. 6, (b) shows the full-color contact state in which the rotatable member 102 rotates by 120 degrees. In this state, the photo-interruptor 101 is unchanged in its state after the photo-interruptor 101 detects the first transmission state.

In FIG. 6, (c) shows a state in which the rotatable member 102 further rotates from the state of (b) of FIG. 6 and thus the second light-blocking surface 103a light-blocks the photo-interruptor 101. This state is the light-blocked state detected after the photo-interruptor 101 detects the first transmission state after the start of the initializing operation. In accordance with the flowchart shown in (b) of FIG. 10, in the control of the laser printer 201, the light-blocking surface light-blocking the photo-interruptor 101 is recognized as the second light-blocking surface 103a and then the sheet-passing count relating to the transfer belt unit 215 is reset. In the case where the second light-blocking surface 103a is detected, the laser printer 201 can recognize by its rotating operation that the phase of the rotatable member 102 returns to the all separation position as a home position.

In FIG. 6, (d) shows a state in which the rotatable member 102 further rotates from the state of (c) of FIG. 6 and thus the boss 103b provided on the movable light-blocking member 103 is contacted to and urged by the cam surface 105. The movable light-blocking member 103 is rotated in a center direction of the rotatable member 102, so that the second light-blocking surface 103a is retracted to the inside of the rotatable member 102 and is pushed into a position where the second light-blocking surface 103a cannot light-block the photo-interruptor 101. At this time, the hook-shaped portion 103c pushes the locking member 106 in the rotational direction of the rotatable member 102 against the urging member, so that a relative position between the locking member 106 and the hook-shaped portion 103c is reversed to that before the pushing-in. As a result, the movable light-blocking member 103 cannot return to the original position. That is, the movable light-blocking member 103 is locked by the locking member 106 so as to maintain the second light-blocking surface 103a moved to the second position by the cam surface 105 at the second position.

In FIG. 6, (e) shows the state in which the rotatable member 102 rotates by 120 degrees from the state of (d) of FIG. 6 and thus movement of all of the primary transfer rollers 216 to the all separation state in which all of the primary transfer rollers 216 are separated from the photosensitive drums is completed. By an operation of a first one full turn in the initializing operation, the movable light-blocking member 103 is moved to the second stop position and is regulated (locked) at the second stop position. In a stage of (c) of FIG. 6, the laser printer 201 which was able to predict the completion of the initializing operation does not perform further rotation, so that the initializing operation is ended.

As described above, according to Embodiment 1, old and new detection of the transfer belt unit can be made by a single photo-interruptor detecting the phase for the contact-and-separation control of the primary transfer rollers. Therefore, an increase in cost can be suppressed to a minimum necessary level, so that it is possible to discriminate the state of an exchangeable unit with a simple constitution.

Embodiment 2

Embodiment 2 according to the present invention will be described.

In this embodiment, as the unit detachably mountable to the apparatus main assembly of the laser printer 201, the fixing unit 212 shown in (b) of FIG. 2 is described as an example. The fixing unit 212 is constituted by the fixing roller and the heating roller. The fixing unit 212 includes a mechanism capable of moving toward and away from the fixing roller pair described with reference to FIG. 7, depending on the print signal of the laser printer 201. The laser printer 201 further includes the drive control device 218 for the contact-and-separation of the fixing roller pair.

Figure 7:
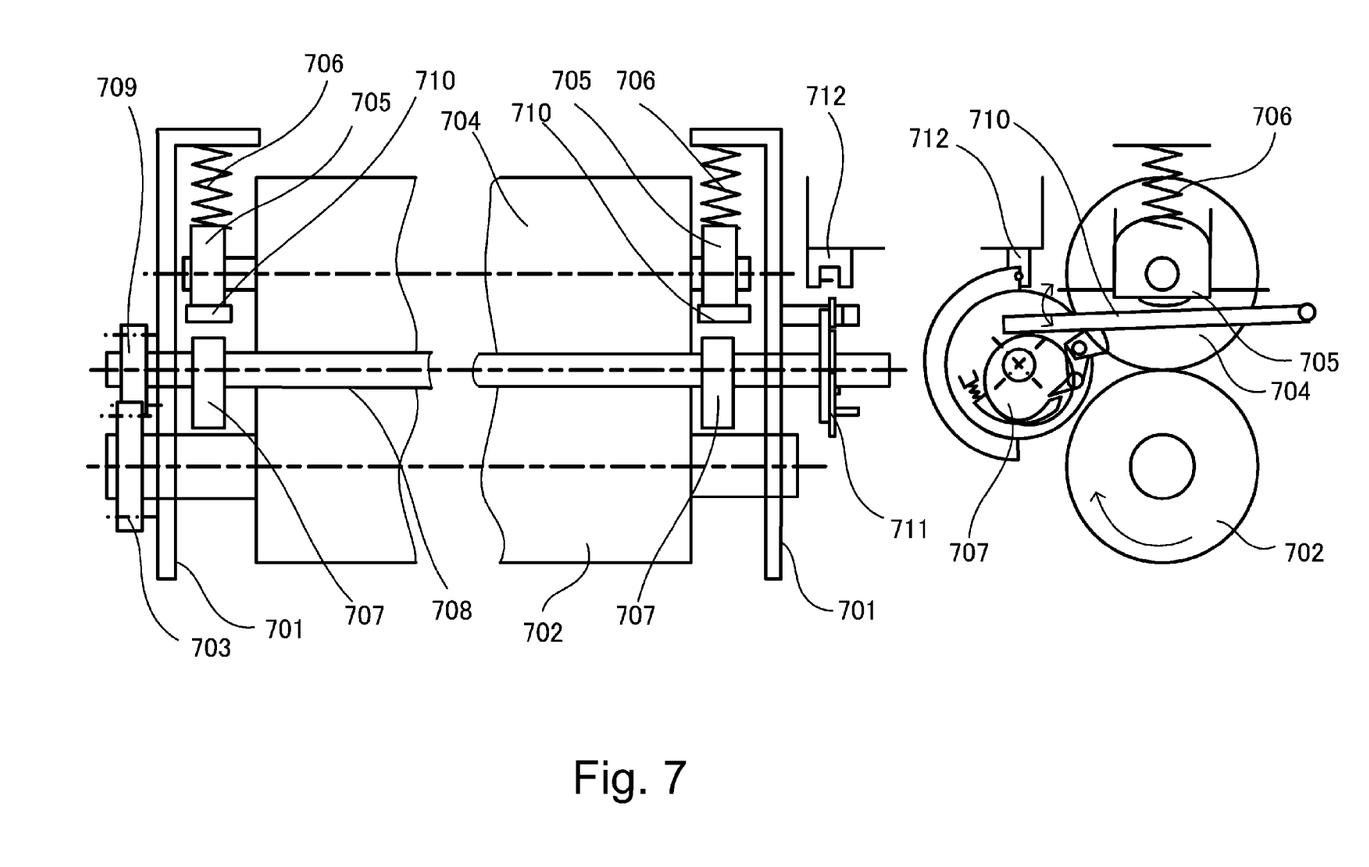
FIG. 7 is a schematic view for illustrating the image forming apparatus in Embodiment 2.

FIG. 7 shows the contact-and-separation mechanism, constituted inside the fixing unit 212, for the fixing roller pair. This mechanism has the function of preventing an image defect with eccentricity of the roller generated by long-term pressing of the fixing roller pair.

A frame 701 of the fixing unit 212 supports an entirety of the unit.

The fixing roller 702 is shaft-supported by the frame 701 at end portions thereof. At a shaft end portion of the fixing roller 702, a gear 703 is mounted and is rotated in a predetermined direction by a driving force from the laser printer 201.

A heating roller 704 includes a heating member such as a halogen heater disposed therein, and melts the unfixed toner by heating of the heating member.

The heating roller 704 is provided with a bearing 705 at each of end portions thereof. The bearing 705 can be reciprocated in a direction of forming a roller nip between the fixing roller 702 and the heating roller 704. The bearing 705 is urged toward the fixing roller 702 by an urging spring 706 disposed between itself and the frame 701. By this urging spring 706, the heating roller 704 is press-contacted to the fixing roller 702.

Two pressure-releasing cams 707s release (eliminate) the press-contact of the fixing roller pair, and are connected by a pressure-releasing shaft 708. At an end portion of the pressure-releasing shaft 708, a gear 709 is mounted. A pressure-releasing lever 710 is provided between the pressure-releasing cam 707 and the bearing 705. The pressure-releasing lever 710 is rotatably mounted on the frame 701. The two pressure-releasing cams 707 are rotated by rotating the gear 709, so that the pressure-releasing cams 707 uniformly act on the bearings at the end portions through the pressure-releasing levers 710, and thus the heating roller 704 is contacted to and separated (spaced) from the fixing roller 702.

A rotatable member 711 constituting a phase detecting means is mounted around the pressure-releasing shaft 708. The rotatable member 711 light-blocks and light-transmits a photo-interruptor 712 as an optical detecting device mounted in the laser printer 201 side.

Using FIG. 8, a drive control device 218 for gears 703 and 709 will be described.

Figure 8:
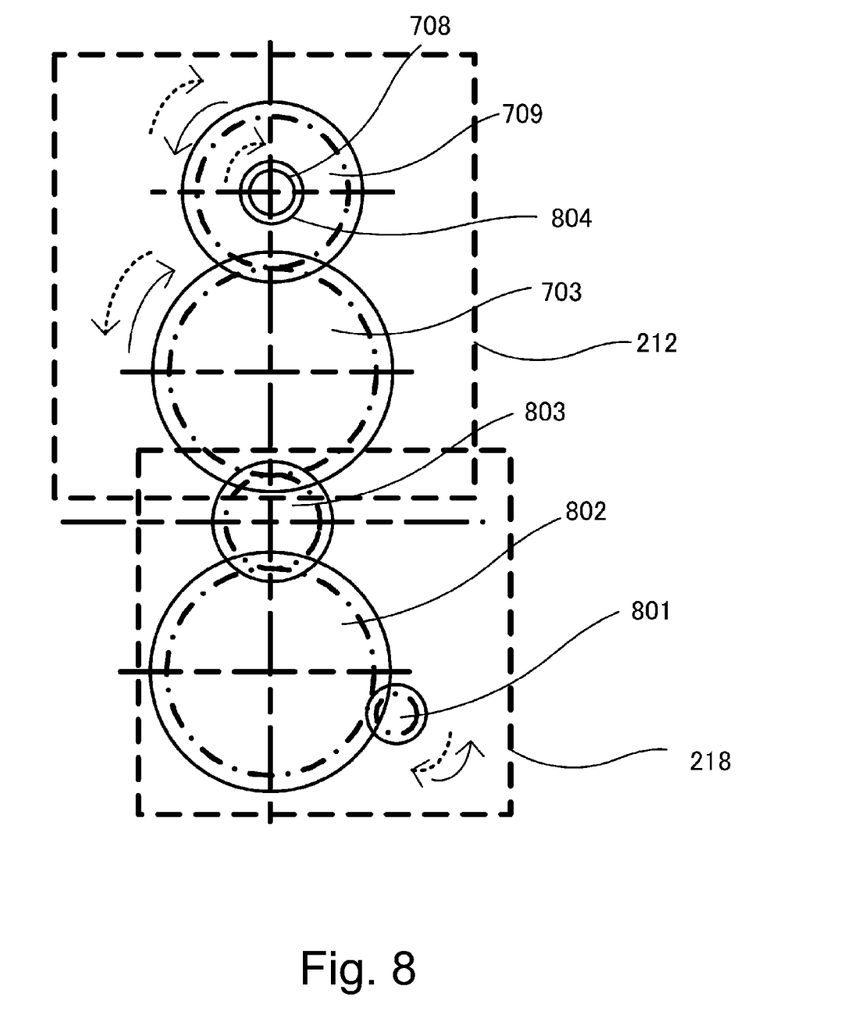
FIG. 8 is a schematic view for illustrating the image forming apparatus in Embodiment 2.

A driving gear 801 is rotated in a normal rotational direction indicated by a solid line in FIG. 8 or a reverse rotational direction indicated by a broken line in FIG. 8, by a driving source rotating at predetermined timing and a predetermined number of rotation. In this embodiment, the driving gear 801 is driven by a stepping motor (not shown) as the driving source and is controlled freely with respect to a speed and the rotational direction by a controller as a control means.

Gears 802 and 803 transmit a rotational force of the driving gear 801 to a gear train of the fixing unit 212. The gear 802 engages with the gear 803, and the gear 803 engages with a gear 793 for the fixing unit 212, so that the rotational force of the driving gear 801 is transmitted to the fixing unit 212.

The gear 703 is rotated by a driving force from the gear 803. At this time, the rotational directions in the laser printer 201 during the printing operation are indicated by solid arrows.

The gear 709 engages with the gear 703 and is rotated by the driving force from the gear 703. A one-way clutch 804 is provided between the gear 709 and the pressure-releasing shaft 708. The one-way clutch 804 is set so as to be idled in the case where the gear 703 is rotated in the arrow direction indicated by the solid line. Therefore, during the printing operation of the laser printer 201, the pressure-releasing cam 707 (FIG. 17) does not operate.

When the driving gear 801 is reversely rotated in the arrow direction indicated by the broken line, the one-way clutch 804 transmits the rotational force of the gear 709 to the pressure-releasing shaft 708, so that the pressure is released (eliminated).

Then, an initializing operation for pressing and separating (spacing) the roller and an operation of the phase detecting means will be described using FIG. 9.

Figure 9:
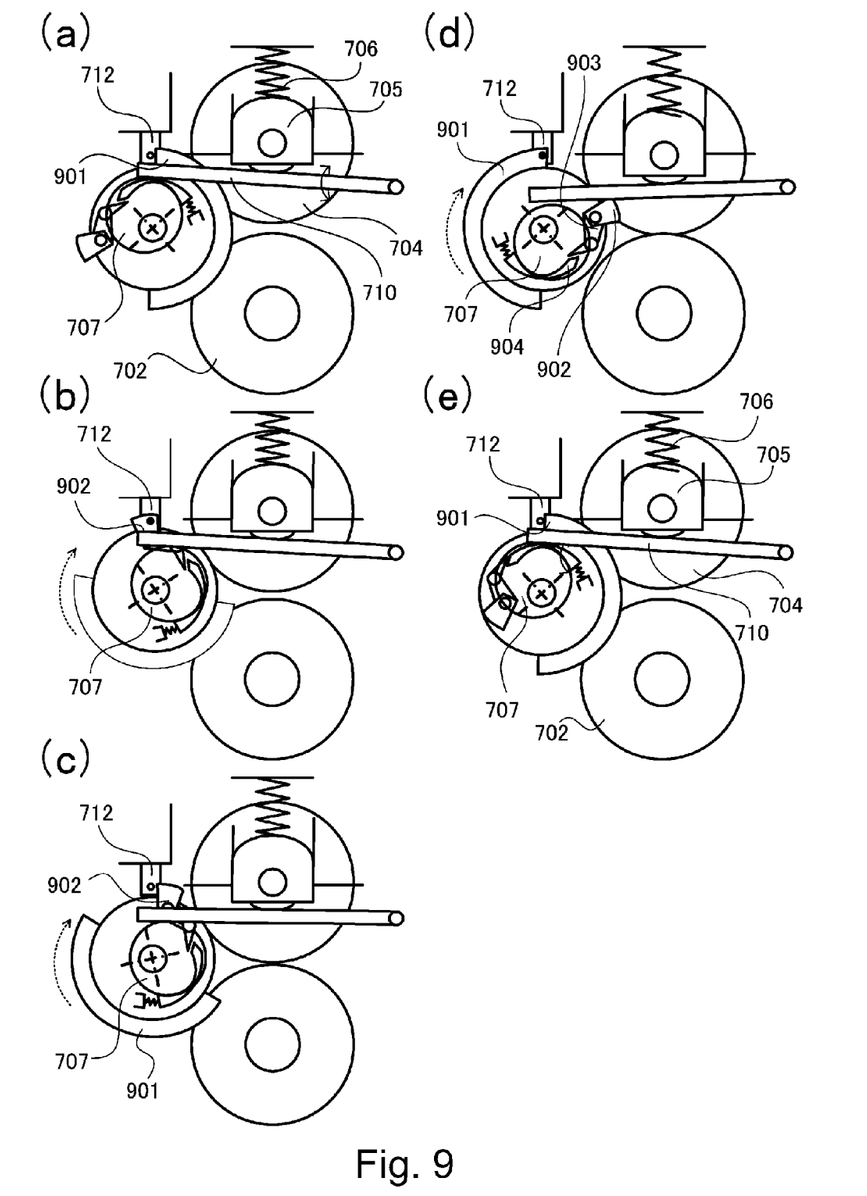

In FIG. 9, (a) shows a state immediately after a new fixing unit 212 is mounted in the laser printer 201. The new fixing unit 202 is in a state in which the rollers of the fixing roller pair are spaced. That is, the new fixing unit 202 is in the state in which the pressure-releasing cam 707 raises the pressure-releasing lever 710 against the urging force of the urging spring 706 and thus the heating roller 704 is spaced from the fixing roller 702.

In FIG. 9, (b) shows a state in which the initializing operation is started and a second light-blocking surface 901 light-blocks the photo-interruptor 712. The driving gear 801 is rotated in the direction opposite to the direction during the printing operation, so that the pressure-releasing cam 707 is rotated in the arrow direction indicated by the broken line.

In FIG. 9, (c) shows a state in which the second light-blocking surface passes through a light-receiving portion of the photo-interruptor 712 and thus the signal indicates the (light-)transmission state. In control of the laser printer 201, a light-block time obtained from the photo-interruptor 712 is discriminated by the flowchart shown in (b) of FIG. 10, so that whether the light-blocking surface is the first light-blocking surface 901 or the second light-blocking surface 902 can be discriminated. Also in this embodiment, similarly as in Embodiment 1, the second light-blocking surface 902 differs from the first light-blocking surface 901 in length of a light-blocking region of the rotatable member 102 with respect to the rotational direction of the rotatable member 711. Specifically, a light-block time of the photo-interruptor 712 by the second light-blocking surface 902 when the rotatable member 711 is rotated is made shorter than a light-block time of the photo-interruptor 101 by the first light-blocking surface 901. Therefore, the laser printer 201 recognizes that the second light-blocking surface 902 passed through the photo-interruptor 712. Thus, the controller discriminates that the fixing unit 212 currently mounted is a new unit and resets the sheet-passing count relating to the fixing unit 212.

In FIG. 9, (d) shows a state in which the pressure-releasing cam 707 further rotates and the first light-blocking surface 901 light-blocks the photo-interruptor 712. The fixing unit 212 is in a state in which the fixing roller pair are press-contacted to each other. That is, the fixing unit 212 is in the state in which rollers of the heating roller 704 is press-contacted to the fixing roller 702 by the urging force of the urging spring 706.

In FIG. 9, (e) shows a state in which the pressure-releasing cam 707 further rotates and the first light-blocking surface 901 passed through the photo-interruptor 712 and thus the state of the photo-interruptor 712 is switched from the light-blocking state to the (light-)transmission state. As described above, in the control of the laser printer 201, it is possible to discriminate whether the light-blocking surface is the first light-blocking surface 901 or the second light-blocking surface 902 depending on whether the light-blocking time obtained from the photo-interruptor 712 is longer or shorter than a predetermined time. Therefore, the laser printer 201 recognizes that the first light-blocking surface 901 passed through the photo-interruptor 712 and stops the driving gear 801, so that the initializing operation is completed. At that time, the fixing unit 212 is again in the spaced (separated) state of the fixing roller pair. That is, the new fixing unit 212 is in the state in which the pressure-releasing cam 707 raises the pressure-releasing lever 710 against the urging force of the urging spring and thus the heating roller 704 is spaced from the fixing roller 702.

Here, during the shift from (d) of FIG. 9 to (e) of FIG. 9, a movable light-blocking member 903 including the second light-blocking surface 902 is pushed toward the center of the rotatable member 711 by a means similar to the means in Embodiment 1, so that the second light-blocking surface 902 is retracted inside the rotatable member 711 and thus is moved to the second position where the second light-blocking surface 902 does not light-block the photo-interruptor 712. At this time, the movable light-blocking member 903 is locked by a locking member 904 so that the second light-blocking surface 902 moved to the second position is maintained at the second position. Therefore, the movable light-blocking member 903 is thereafter regulated (locked) by the locking member 904 so that the second light-blocking surface 902 does not return to the first position where the second light-blocking surface 902 projects to an outside of the rotatable member 711 to light-block the photo-interruptor 712. For that reason, until the unit is exchanged with a new unit next time, the second light-blocking surface 902 is not detected by the photo-interruptor 712 through the subsequent rotation of the rotatable member 711.

Then, using FIG. 9, switching control of the phase position of the pressure-releasing cam 707 will be described.

When the printing operation of the laser printer 201 is started, the phase position of the pressure-releasing cam 707 is moved from the separated position shown in (e) of FIG. 9 to the contacted position shown in (d) of FIG. 9. By the rotation of the driving gear 801 in the direction opposite to the direction during the printing operation, the pressure-releasing cam 707 is rotated. Then, the controller as the control means discriminates that the pressure-releasing cam 707 is in the state shown in (d) of FIG. 9 by switching of the signal of the photo-interruptor 712 from the transmission state to the light-blocking state by the first light-blocking surface 901 and thus the movement thereof to the contacted position is completed.

On the other hand, in the case where the printing operation is ended and the pressure-releasing cam 707 is returned again to the separated position, the pressure-releasing cam 707 is rotated by the rotation of the driving gear 801 in the direction opposite to the direction during the printing operation. Then, the controller as the control means discriminates that the pressure-releasing cam 707 is in the state shown in (e) of FIG. 9 by switching of the signal of the photo-interruptor 712 from the light-blocking state to the transmission state by the first light-blocking surface 901 and thus the movement thereof to the separated position is completed.

Therefore, by continuously switching the phase position of the pressure-releasing cam 707, it is possible to continuously switch the position of the rotatable member 711 to the two phase positions (contacted position and separated position).

As described above, according to Embodiment 2, phase detection of the pressure-releasing cam and old and new detection of the fixing unit can be made by a single photo-interruptor detecting the phase for the contact-and-separation control of the fixing roller pair. Therefore, an increase in cost can be suppressed to a minimum necessary level, so that it is possible to discriminate the state of an exchangeable unit with a simple constitution.

Other Embodiments

In Embodiment 1 described above, as the exchangeable unit with respect to the image forming apparatus main assembly, the transfer belt unit constituted by the transfer roller, the belt member, the stretching roller and the like which are used for transferring the toner image from the image bearing member onto the recording material was described as an example. Further, in Embodiment 2 described above, the fixing unit constituted by the fixing roller and the heating roller which are used for fixing the transferred toner image on the recording material was described as an example. However, the present invention is not limited thereto. For example, such a process cartridge that the photosensitive drum and as the process means actable on the photosensitive drum, the charging means, the developing means and the cleaning means are integrally assembled into a unit may also be employed. Or, a process cartridge prepared by integrally assembling the photosensitive drum and either one of the charging means, the developing means and the cleaning means into a unit may also be employed. A similar effect can be obtained by applying the present invention to an image forming apparatus in which these units are exchangeable.

Further, in Embodiments 1 and 2, as the image forming apparatus in which the unit is exchangeable, the printer was described as an example, but the present invention is not limited thereto. For example, the image forming apparatus may also be other image forming apparatuses such as a copying machine, a facsimile machine and a multi-function machine having a combination of functions of these machines. The image forming apparatus may also be an image forming apparatus in which a recording material carrying member is used and respective color toner images are successively transferred onto a recording material carried on the recording material carrying member. A similar effect can be obtained by applying the present invention to these image forming apparatuses.

While the invention has been described with reference to the structures disclosed herein, it is not confined to the details set forth and this application is intended to cover such modifications or changes as may come within the purpose of the improvements or the scope of the following claims.

This application claims the benefit of Japanese Patent Application No. 2014-184285 filed on Sep. 10, 2014, which is hereby incorporated by reference herein in its entirety.

What is claimed is:

1. An image forming apparatus comprising:
   an optical detecting device mounted in a main assembly of said image forming apparatus;
   a movable unit, detachably mountable to the main assembly, including a rotatable member having a first light-blocking surface for blocking light and a second light-blocking surface different from the first light-blocking surface in length of a light-blocking region of said rotatable member with respect to a rotational direction of said rotatable member; and
   a control unit,
   wherein said movable unit rotates with rotation of said rotatable member so that the second light-blocking surface is movable to a first position where said optical detecting device is light-blocked and a second position where said optical detecting device is not light-blocked, and includes a locking member for locking the second light-blocking surface so that the second light-blocking surface moved to the second position is maintained in the second position, and
   wherein when the first light-blocking surface and the second light-blocking surface pass through a detecting portion of said optical detecting device by the rotation of said rotatable member, said control unit discriminates a state of said movable unit on the basis of a detection result of said optical detecting device.

2. An image forming apparatus according to claim 1, wherein with respect to the rotational direction of said rotatable member, the length of the light-blocking region of the second light-blocking surface is shorter than the length of the light-blocking region of the first light-blocking surface.

3. An image forming apparatus according to claim 2, wherein said control unit discriminates whether or not which one of the first light-blocking surface and the second light-blocking surface passes through the detecting portion on the basis of the detection result of said optical detecting device.

4. An image forming apparatus according to claim 1, wherein said locking member is mounted on said rotatable member so as to be movable in the rotational direction of said rotatable member, and a rotation center of said locking member is the same as a rotation center of said rotatable member.

5. An image forming apparatus according to claim 1, wherein said optical detecting device includes a photo-interruptor.

6. An image forming apparatus according to claim 1, further comprising a movable light-blocking member including the second light-blocking surface and movable relative to said rotatable member.

7. An image forming apparatus according to claim 6, wherein said movable light-blocking member rotates integrally with said rotatable member, and when the second light-blocking surface is moved to the second position by a cam member, the second light-blocking surface is retracted from the first position toward a rotation center of said rotatable member.

8. An image forming apparatus according to claim 1, further comprising a plurality of image bearing members, wherein said movable unit includes an endless belt and a plurality of contact members contactable to an inner peripheral surface of the belt so as to cause the belt and the plurality of image bearing members to contact each other.

9. An image forming apparatus according to claim 8, wherein said control unit is capable of executing an operation in a first mode in which the plurality of contact members contact the belt and an operation in a second mode in which one of the plurality of contact members contacts the belt, and
   wherein when said control unit executes the operation in the second mode, the first light-blocking surface is positioned at the detecting portion of said optical detecting device.

10. An image forming apparatus according to claim 8, wherein said control unit discriminates a contact state and a separation state of the plurality of contact members with respect to the belt.

11. An image forming apparatus according to claim 8, wherein said movable unit includes a slidable member for changing a state of the plurality of contact members with respect to the belt by moving the plurality of contact members and includes a cam for moving the slidable member.

12. An image forming apparatus according to claim 8, wherein a cam and said rotatable member integrally rotate.

13. An image forming apparatus according to claim 1, wherein when the second light-blocking surface passes through the detecting portion of said optical detecting device after the first light-blocking surface passes through the detecting portion, said control unit discriminates that said movable unit is in a new state on the basis of the detection result of said optical detecting device.

14. An image forming apparatus according to claim 1, wherein said movable unit has an acting surface for moving the second light-blocking surface to the second position by acting on the second light-blocking surface placed in the first position.

15. An image forming apparatus according to claim 1, wherein said movable unit includes a fixing roller and a pressing roller, and
   wherein said control unit discriminates whether or not the fixing roller and the pressing roller are in a press-contact state by said optical detecting device and the first light-blocking surface.

* * * * *